Patented Jan. 16, 1934

1,943,461

UNITED STATES PATENT OFFICE 1,943,461

CELLULOSE ETHER AND METHOD OF MAKING SAME

David Traill and Alfred Stoyell Levesley, Saltcoats, Scotland, assignors to Imperial Chemical Industries, Ltd., a corporation of Great Britain No Drawing. Application February 18, 1931, Serial No. 516,827, and in Great Britain April 16, 1930

9 Claims. (Cl. 260—152)

This invention relates to cellulose ethers, and in particular to cellulose ethers of low viscosity and the method of making same.

Heretofore cellulose ethers of materially reduced viscosity have not been prepared, nor have cellulose ethers of even moderately reduced viscosity been prepared having good properties for use in films, et cetera, i. e., they did not give films of high tensile strength and satisfactory resistance to water and weathering.

An object of the present invention is to provide a low viscosity cellulose ether having excellent film forming properties. A further object is to provide a practical process for the production of such cellulose ethers. Other objects will be apparent from the following description of the invention.

These objects are accomplished according to this invention by treating a high viscosity cellulose ether with a dilute acid at elevated temperature and pressure until the viscosity of the ether has been reduced as far as desired.

By high viscosity cellulose ether is meant an ether having a viscosity of at least 100 c. g. s. units and up to and above 3,000 c. g. s. units as measured in a 10% solution of the ether in a solvent consisting of 80 volumes of toluene and 20 volumes of ethyl alcohol. All viscosities hereinafter referred to were determined by measuring a 10% solution of the ether in a solvent consisting of 80 volumes of toluene and 20 volumes of ethyl alcohol.

This process is conveniently carried out by heating a high viscosity cellulose ether prepared in any known manner, and preferably in comminuted form, of such fineness as to pass a 20-50 mesh screen, with a dilute acid or a mixture of dilute acids in a closed vessel for approximately twenty minutes to one hour. The exact amount of dilute acid used is not material. However, it should be present in sufficient amount to uniformly contact with the ether and, as a rule, several times the weight of the ether of a dilute acid is used.

If desired, the cellulose ether may be pretreated with a swelling agent but this is not preferred as the ether after such treatment is apt to be sticky and difficult to handle. The acid, which may be either inorganic or organic and a single acid or a mixture of acids, is diluted with water or alcohol or other diluents compatible therewith and may contain so-called "wetting agents", although this is not necessary. Among the acids which are particularly adapted for use in this process are hydrochloric and oxalic acids, although the process is not limited to any particular acid or classes of acids. Other acids suitable for this process include acetic, formic and sulphuric acids, acid sulphates, and phosphoric acid.

The reduction in viscosity depends on the temperature, pressure, the length of time of treatment, and the concentration of the acid. As the length of time is increased so also is the reduction in viscosity increased. However, the reduction in viscosity takes place much more rapidly at first and becomes relatively slow at the end of an hour or so. A period of about twenty minutes to one hour is sufficient for the treatment and it is preferred not to extend the treatment materially over one hour. The shortest period of treatment necessary to get the desired reduction in viscosity, complying with other conditions of carrying out the process, will give the best product.

The pressure will be dependent upon the temperature where the treatment is carried out in an autoclave and the pressure built up solely through heating. The pressure may vary between 10-75 pounds per sq. in., which corresponds to a temperature of 115-160° C., but it is preferred to keep the pressure between 25-50 pounds per sq. in., which corresponds to a temperature of 130-148° C. As the pressure and temperature are increased the reduction in viscosity likewise increases. It is to be understood that the process may be carried out using an external source of pressure and that the use of an autoclave and the building up of the pressure solely through heating same is only one convenient form of carrying out the process.

The concentration of acid should be kept between 0.5-5.0%. A higher concentration of acid gives greater reduction in viscosity but should be avoided due to the harmful effect it has on the film forming properties of the treated ether.

The following specific examples are given to illustrate the invention in detail and not by way of limitation. The parts are given by weight:—

*Example 1.*—100 parts of ethyl cellulose having a viscosity of 200 c. g. s. units were heated in an autoclave with ten times their weight of a 0.5% aqueous solution of hydrochloric acid at a pressure of 50 pounds per sq. in. for one-half hour. The product at the end of this treatment was a spongy mass which was finely ground in an edge runner mill and washed free from acid. The viscosity of the ether after this treatment was found to be between 5-10 c. g. s. units. The ether was substantially free from degradation products and had good film forming properties.

*Example 2.*—100 parts of benzyl cellulose having a viscosity of 1,000 c. g. s. units were heated in an autoclave with eight times their weight of water containing 0.75% of hydrochloric acid at a pressure of 50 pounds per sq. in. for one-half hour with agitation. The ether was then ground and washed as in Example 1 and its viscosity was found to be 1–5 c. g. s. units. This ether possessed remarkably advantageous properties for use in lacquers.

*Example 3.*—100 parts of benzyl cellulose having a viscosity of 2,000 c. g. s. units were treated with 1,000 parts of water containing 1% of oxalic acid for twenty minutes at a pressure of 50 pounds per sq. in. The product after grinding and washing was a pure white powder which had a viscosity of 80–100 c. g. s. units and possessed excellent film forming properties.

Cellulose ethers of excellent film forming properties are obtained by the present process which is easily carried out, economical of operation and rapid. The reduction in viscosity can be controlled as the examples show. The resulting low viscosity ethers are substantially free from degradation products and are adapted for a variety of uses, particularly in lacquers, due to the fact that ethers can be obtained of less than 10 c. g. s. units, or even 5 c. g. s. units, but having high tensile strength and excellent water and weather resisting properties. These ethers give clear, colorless films. Heretofore ethers having the properties above described have not been known.

It is also found that as a result of this treatment the solubility of the cellulose ethers is increased, the amount of this increase varying according to the particular solvents used. The following table shows the result of treating a sample of benzyl cellulose:

| Solvent | Insoluble before treatment | Insoluble after treatment for ½ hour at 50 lbs. pressure with 1.9% aqueous hydrochloric acid |
|---|---|---|
| | Percent | Percent |
| Benzene | 87.4 | 84.4 |
| Alcohol | 97.5 | 82.8 |
| Acetone | 54.3 | 15.5 |
| 90:10 xylene-butyl alcohol mixture | 52.9 | 16.2 |
| 80:20 toluene-industrial spirits mixture | 0.6 | 0.6 |

The small portion insoluble in 80:20 toluene-industrial spirits mixture may be reckoned as impurity in the benzyl cellulose.

As many apparently and widely different embodiments of this invention may be made without departing from the spirit and scope thereof, it is to be understood that we do not limit ourselves to the specific embodiments thereof except as defined in the appended claims.

We claim:

1. Process of reducing the viscosity of a cellulose ether comprising treating the ether with a dilute acid from the group consisting of hydrochloric, oxalic, acetic, formic, sulphuric, and phosphoric acids at a pressure of 10–75 pounds per sq. in. and a temperature of 115–160° C. for not substantially over one hour.

2. Process of reducing the viscosity of a cellulose ether comprising treating the ether with a 0.5–5.0% solution of hydrochloric acid at a pressure of 10–75 pounds per sq. in. and a temperature of 115–160° C. for not substantially over one hour.

3. Process of reducing the viscosity of a cellulose ether of the group consisting of ethyl cellulose and benzyl cellulose which comprises treating the ether with a dilute acid of the group consisting of hydrochloric acid and oxalic acid at a pressure of 10–75 pounds per sq. in. and a temperature of 115–160° C. for twenty minutes to one hour.

4. Process of reducing the viscosity of a cellulose ether of the group consisting of ethyl cellulose and benzyl cellulose which comprises treating the ether with a dilute acid of the group consisting of hydrochloric acid and oxalic acid at a pressure of 25–50 pounds per sq. in. and a temperature of 130–148° C. for twenty minutes to one hour.

5. Process of reducing the viscosity of a cellulose ether of the group consisting of ethyl cellulose and benzyl cellulose which comprises treating the ether with a 0.5–5.0% solution of hydrochloric acid at a pressure of 25–50 pounds per sq. in. and a temperature of 130–148° C. for twenty minutes to one hour.

6. Process of reducing the viscosity of a cellulose ether comprising heating the ether with several times its weight of a dilute acid from the group consisting of hydrochloric, oxalic, acetic, formic, sulphuric and phosphoric acids in an autoclave at a temperature of 115–160° C. for not substantially over one hour.

7. Process of reducing the viscosity of a cellulose ether of the group consisting of ethyl and benzyl cellulose comprising heating same with several times its weight of a 0.5–5.0% solution of hydrochloric acid in an autoclave at a temperature of 130–148° C. for not substantially over one hour.

8. Process of reducing the viscosity of a cellulose ether comprising treating the ether with a dilute acid from the group consisting of hydrochloric, oxalic, acetic, formic, sulphuric, and phosphoric acids at a pressure of 10–75 pounds per square inch and a temperature of 115–160° C. until the viscosity is reduced to less than 10 c.g.s. units at 10% concentration in a solvent composed of 80% toluene and 20% alcohol by volume.

9. Process of reducing the viscosity of a cellulose ether comprising treating the ether with dilute hydrochloric acid at a pressure of 10–75 pounds per square inch and a temperature of 115–160° C. until the viscosity is reduced to less than 10 c.g.s. units at 10% concentration in a solvent composed of 80% toluene and 20% alcohol by volume.

DAVID TRAILL.
ALFRED STOYELL LEVESLEY.